United States Patent [19]

Huang

[11] Patent Number: 5,755,634

[45] Date of Patent: May 26, 1998

[54] INFLATABLE BALL WITH A DIGITAL PRESSURE DISPLAY

[76] Inventor: Tien-Tsai Huang, No. 4-2, Lane 30, Wu Chuan St., Pan Chiao City, Taipei, Taiwan

[21] Appl. No.: 858,570

[22] Filed: May 19, 1997

[51] Int. Cl.⁶ ........................................... A63B 41/00
[52] U.S. Cl. .............................................. 473/570
[58] Field of Search ................................. 473/569, 570, 473/571, 593, 599, 603, 604, 605, 609, 610, 611; 73/714, 866.3

[56] References Cited

U.S. PATENT DOCUMENTS

| | | |
|---|---|---|
| 4,577,865 | 3/1986 | Shishido ............................. 473/570 |
| 4,775,948 | 10/1988 | Dial et al. ............................. 473/570 |
| 5,098,095 | 3/1992 | Weiss ................................... 473/593 |
| 5,677,492 | 10/1997 | Huang .................................. 73/715 |

*Primary Examiner*—Steven B. Wong
*Attorney, Agent, or Firm*—Bacon & Thomas

[57] ABSTRACT

An inflatable ball with a digital pressure display including a ball body, and a pressure display mechanism disposed in the ball body. The pressure display mechanism includes a pressure sensor and a display. The sensor may detect the pressure of air inside the ball body, and the display indicates the air pressure value, so that the user may know the amount of air pressure in the ball body any time.

6 Claims, 3 Drawing Sheets

INFLATABLE BALL WITH A DIGITAL PRESSURE DISPLAY

BACKGROUND OF THE INVENTION (a) Field of the Invention

The present invention relates generally to an inflatable ball such as basketball, volley ball, rugby, and football, and more, particularly to an inflatable having a digital display for displaying the amount of the air pressure inside the ball.

(b) Description of the Prior Art

As is well known, inflatable balls such as basketball, volley ball, rugby, and football have to be inflated from time to time in order to maintain a certain an air pressure inside the ball. The problem with existing inflatable balls is that users, particularly non-professional players, often press the ball or hit the ball against the ground in order to feel or determine by experience whether or not the ball need to be inflated or is leaking. Such methods of determining whether or not the ball needs inflation are not reliable, especially when ball playing is a team sport, and every one has his/her own view.

In addition, even if the ball has been inflated at home using an air pump, the air pressure inside the ball may change due to change in temperature when the ball is brought to the field.

Furthermore, inserting an air manometer into the valve to test the air pressure inside the ball may cause leakage of air during the process of insertion. That is the reason why users do not like to bring with them an air manometer. Besides, it is not convenient to carry. An inflatable ball capable of displaying the magnitude of air pressure inside the ball for the users' reference is desirable.

SUMMARY OF THE INVENTION

According to an aspect of the present invention, the inflatable ball with digital pressure display essentially comprises a ball body including interconnected first layer and second layer, the ball body being inflatable via a valve, and a pressure display mechanism disposed inside the ball body and including a pressure sensor for detecting the amount of air pressure inside the ball body, and a display for indicating the air pressure value on the ball. As the pressure display mechanism is directly attached to the ball body, the user may read the air pressure value any time and may readily determine whether the ball needs inflation, thus eliminating the problems with the prior art.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
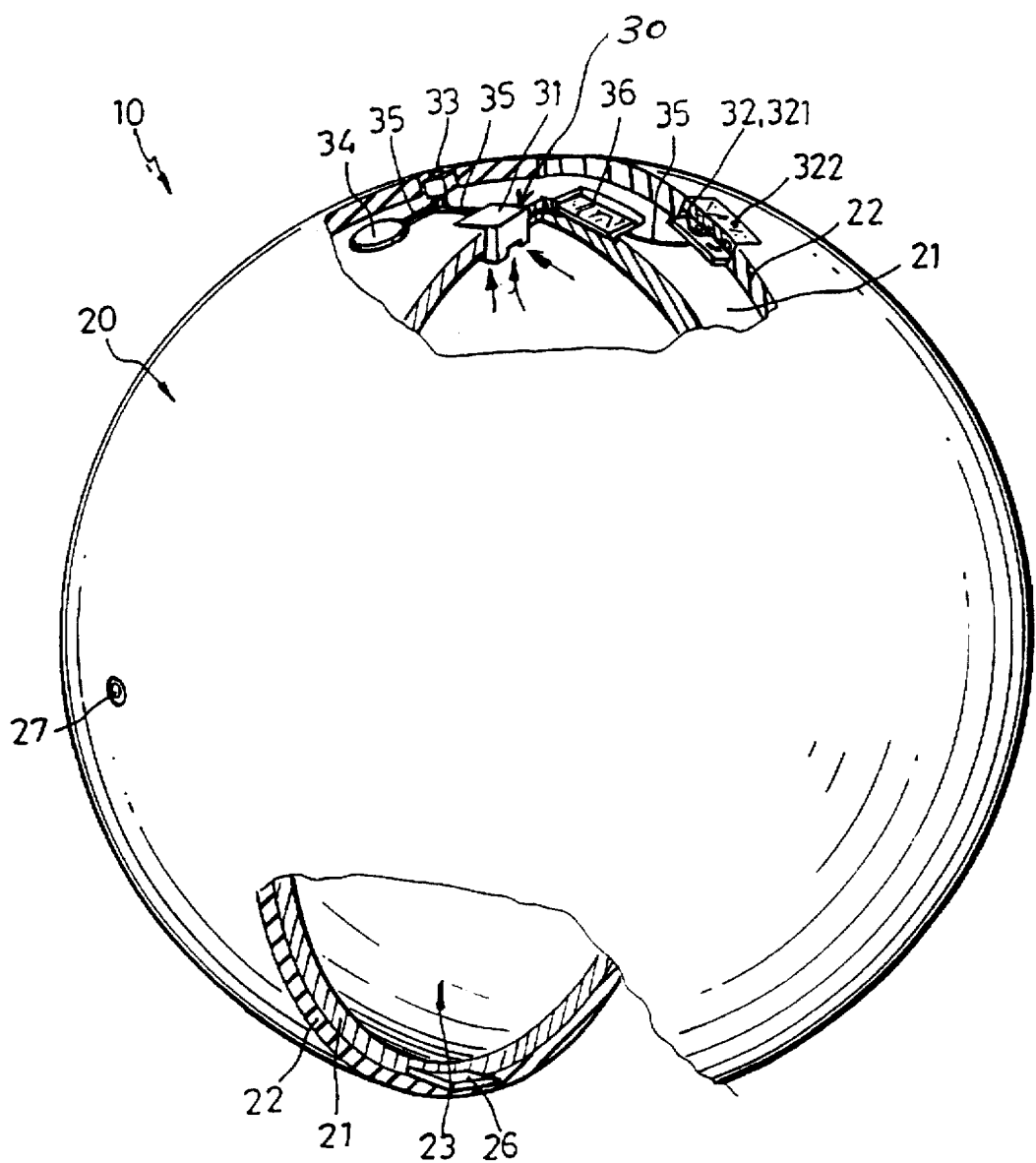
FIG. 1 is an elevational of the inflatable ball of the present invention, with parts thereof cut away to expose the internal structure.

With reference to FIG. 1, an inflatable ball 10 having a digital pressure display essentially comprises a ball body 20 and a pressure display mechanism 30.

In order that the pressure display mechanism 30 may be disposed in the ball body 20, the ball body 20 in this preferred embodiment is comprised of interconnected first layer 21 and second layer 22. First of all, the pressure display mechanism 30 is fixedly provided in the first layer 21. Then the second layer 22 encloses the first layer 21, with such components of the pressure display mechanism 30 as switch 33 and display 32 exposed on the outside. The rest of the components such as a pressure sensor 31, a circuit board 36, and a wire 35 are embedded in the second layer 22.

Figure 3:
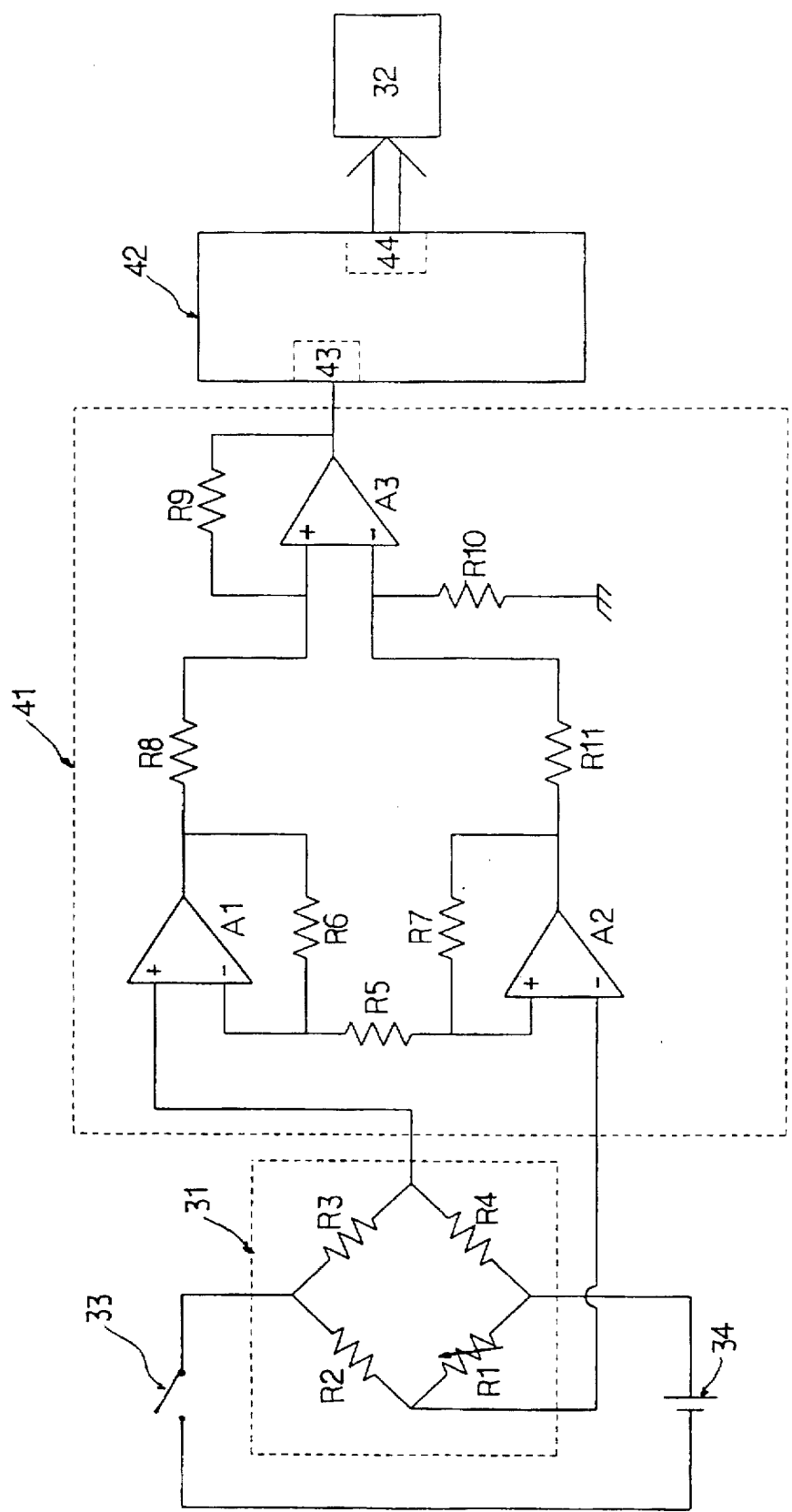
FIG. 3 is a preferred embodiment of a circuit diagram of the present invention.

Reference is now made to FIG. 3, which shows a circuit diagram of the pressure display mechanism 30. R1–R11 are resistors; A1–A3 are amplifiers. The pressure display mechanism 30 uses a battery 34 as a driving power source. The pressure sensor 31 may be any sensor for sensing air pressure, which may output electric currents or voltages of different amplitude with the amplitude of the air pressure. The signal output by the pressure sensor 31 are sent via an amplifying circuit 41 to a microprocessor 42. And the air pressure value is indicated by the display 32. In order to save the power of the battery 34, the display 32 may be a digital LCD display 321, so that the microprocessor 42 may have an analog-digital converter 43 and an LCD propeller 44. After the amplifying circuit 41 has passed the analog-digital signal to the analog-digital converter, the analog signal is converted into digital signal before being input into the microprocessor 42. The above-mentioned amplifying circuit 41 and the microprocessor 42 may be placed on the same circuit board 36 to facilitate their insertion into the ball body 20, as in this embodiment. Alternatively, the pressure sensor 33, switch 31, and battery 34 may all be placed on the same circuit board 36.

In order to protect the LCD display 321 from being damaged and to ensure that the air pressure value indicated thereby may be seen, a transparent sheet 322 is placed on the LCD display 321. Preferably, the transparent sheet 322 is soft and made of the same material as that of the second layer 22 of the ball body 20, and is adhered or coupled to the second layer 22.

The most power-consuming component of the pressure display mechanism 30 is the LCD display 321. The battery 34 may, as a general rule, last for two years. In this embodiment, the switch 33 in this embodiment is especially arranged for saving the electric energy of the battery 34. Only when the user turns on the switch 33 will electric power be supplied to the LCD display 321 to indicate the air pressure inside the ball. Hence, the battery 34 may last for a longer period. Under normal conditions, the battery 34 will last longer than the ball so that it is not necessary to replace the battery.

Additionally, since the pressure display mechanism 30 has a certain weight, in order to balance the weight of the ball, one or more balancing blocks 26 may be arranged between the first layer 21 and the second layer 22 at suitable positions.

Figure 2:
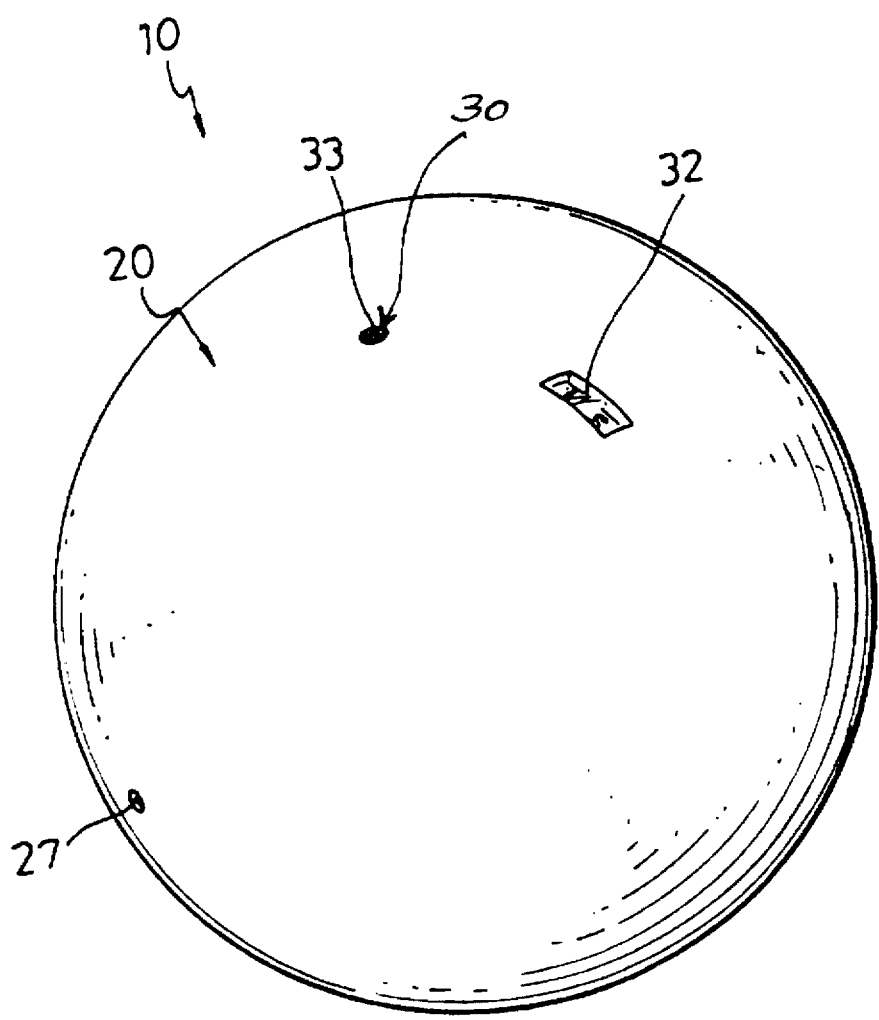
FIG. 2 is a elevational view of the inflatable ball of the present invention.

FIG. 2 shows the outer appearance of the ball 10 of the present invention. It can be seen that, aside from a valve 27, there is the display 32 and the switch 33.

The main object of the present invention is to enable the user to know the magnitude of air pressure inside the ball any time. The above-described embodiment is only an example, and the present invention may permit various changes and modifications. For instance, the first layer and the second layer may not be two complete spherical layers as in the above-described embodiment. And only at the location where the pressure display mechanism is installed may there be first and second layers so that the rest of the ball is simply comprised of the first layer or the second layer. Furthermore, the present invention is not limited to round balls; any inflatable ball such as rugby may do.

Therefore, although the present invention has been illustrated and described with reference to the preferred embodiment thereof, it should be understood that it is in no way limited to the details of such -embodiment but is capable of numerous modifications within the scope of the appended claims.

What is claimed is:

1. An inflatable ball with a digital pressure display, comprising:

a ball body, comprising a first layer and a second layer which are interconnected, said ball body being inflatable via a valve;

a pressure display mechanism, provided in said ball body and comprising a pressure sensor for sensing the air pressure inside said ball body, and a display for displaying the sensed air pressure value to enable the user to know the pressure of air inside said ball body.

2. An inflatable ball with a digital pressure display as claimed in claim 1, wherein said pressure sensor may output different electric current or electric voltage signals according to change in air pressure, and said pressure display mechanism further comprises a battery, for supplying electric power to said pressure display mechanism; a switch, for determining the start or stop of said pressure display mechanism, said switch being exposed on said second layer of said ball body; an amplifying circuit, for amplifying the signals output by said pressure sensor; and a microprocessor, for processing the pressure signals passed thereto before sending the processed signals to said display for indicating the pressure of air inside said ball body.

3. An inflatable ball with a digital pressure display as claimed in claim 1, wherein said display is an LCD display, and said microprocessor is capable of analog-digital conversion.

4. An inflatable ball with a digital pressure display as claimed in claim 1, wherein said display is an LCD display, and said pressure display mechanism further comprises an analog-digital converter, an LCD propeller, and a microprocessor, so that detected pressure signals are first sent to said analog-digital converter before they are sent to said microprocessor and said LCD propeller and finally to said display for showing the air pressure inside ball body.

5. An inflatable ball with a digital pressure display as claimed in claim 1, wherein said display has a protective transparent sheet disposed thereon.

6. An inflatable ball with a digital pressure display as claimed in claim 1, wherein the shape of said first layer and said second layer of said ball body may be substantially the same.

* * * * *